April 10, 1956 A. W. McCULLOCH 2,741,510
CASTER WHEEL SUPPORT FOR PIPES
Filed Dec. 7, 1951 2 Sheets-Sheet 2
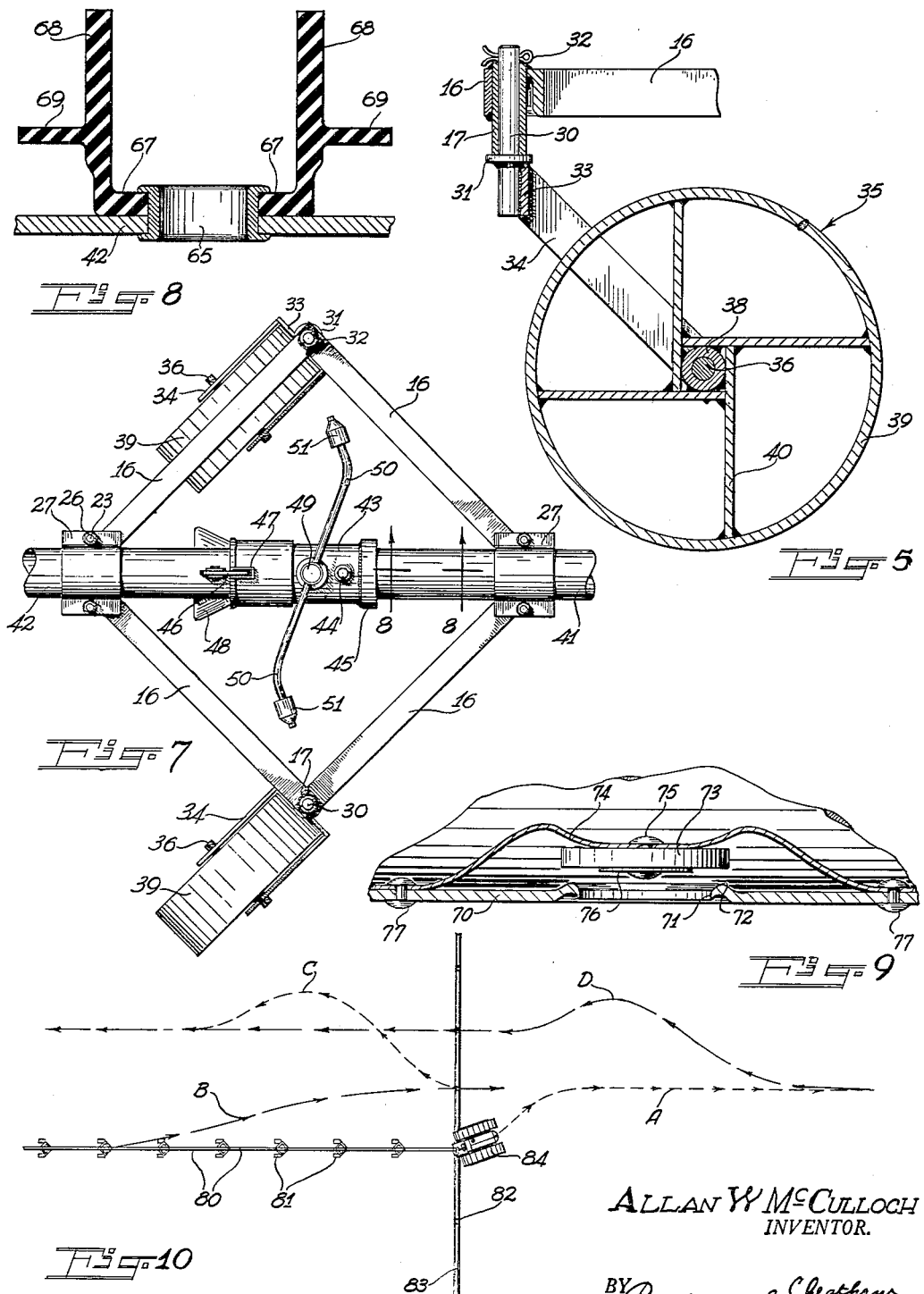
ALLAN W McCULLOCH
INVENTOR.
BY Buckhorn and Cheatham
ATTORNEYS

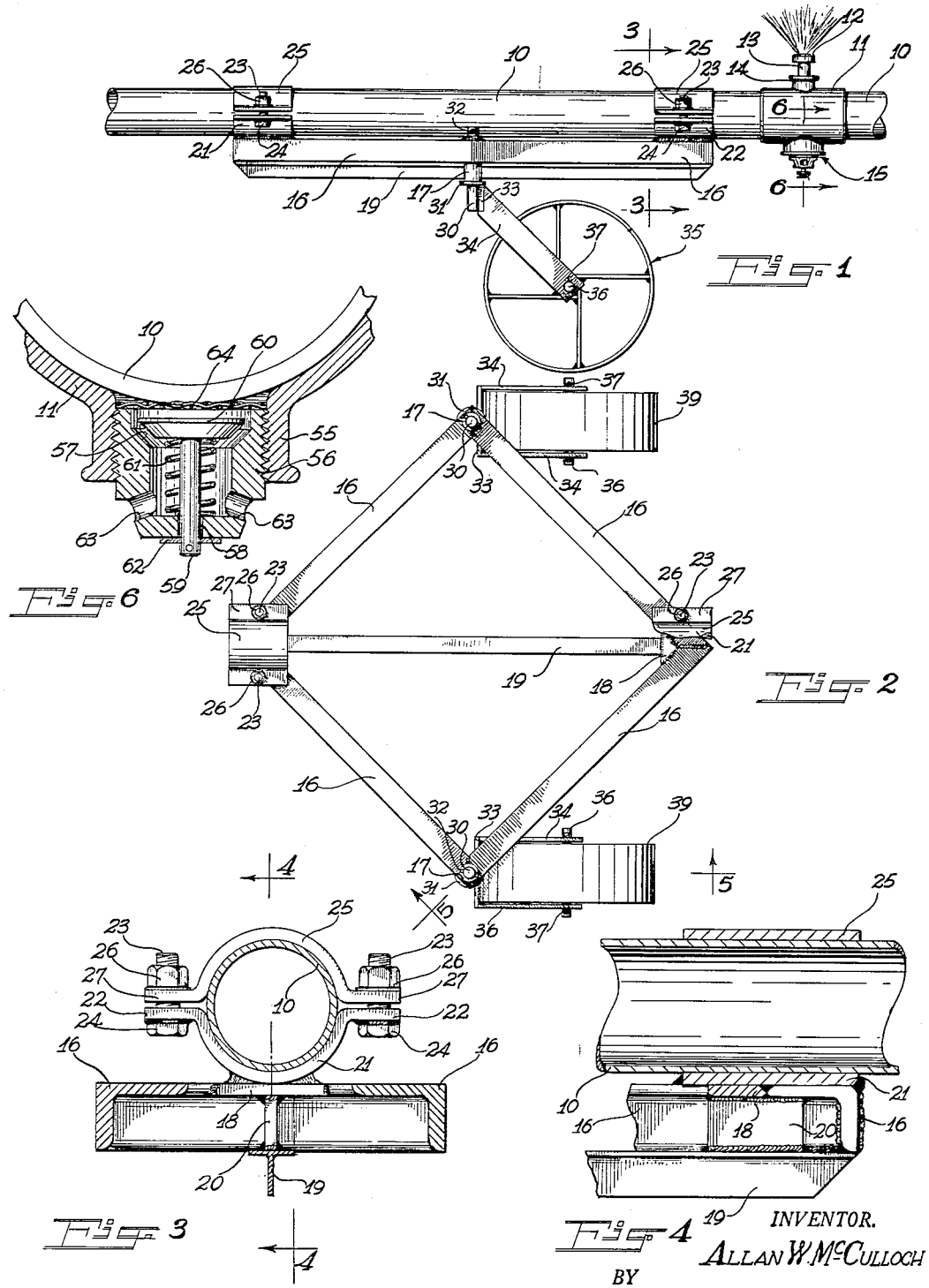

United States Patent Office 2,741,510
Patented Apr. 10, 1956

2,741,510

CASTER WHEEL SUPPORT FOR PIPES

Allan W. McCulloch, Denver, Colo., assignor to Irrigation Equipment Co., Inc., Eugene, Oreg., a corporation of Oregon Application December 7, 1951, Serial No. 260,494

3 Claims. (Cl. 299—47)

The present invention relates to portable irrigation equipment comprising an elongated pipe line supporting a plurality of spaced outlet means for sprinkling or irrigating a large area. The present invention comprises wheeled means which may be mounted at spaced intervals along such a pipe line whereby the pipe line may be moved from section to section of a large field.

It is common practice to irrigate a large field by means of a grid of permanently installed pipe lines comprising sections of pipe rigidly coupled together, and it is equally common practice to reduce the amount of equipment required by substituting for the rigid couplings some form of quick-acting, flexible coupling whereby a pipe line may be separated into short lengths which may be manually transported and reassembled to irrigate successive sections of the field. It is also common practice to mount rigidly coupled or flexibly coupled pipe lines on wheels by means of which the pipe line may be moved as a unit. Such wheels may be coaxially mounted upon the pipe line whereby the pipe line functions as a common axle for all the wheels so that the pipe line may be rolled in a direction transverse to its length; such wheels may be mounted on short axles extending transversely of the pipe line whereby the pipe line may be rolled from place to place in a longitudinal direction; and such wheels may be pivotally mounted so that the pipe line may be moved transversely, longitudinally or diagonally. The present invention relates to the latter form of assembly in that the invention comprises a pipe line including a plurality of spaced dollies each of which supports a pair of caster wheels mounted at the sides of the pipe line and capable of swiveling so as to permit the pipe line to move in any direction. In one aspect an object of the present invention is to provide an improved dolly permitting various advantages over the prior art as will appear. In another aspect an object of the present invention is to provide a flexibly coupled pipe line mounted upon improved caster wheel dollies in such fashion that the wheel-mounted assembly including flexible, quick-acting coupling means is provided with certain advantages heretofore limited to rigidly coupled pipe line assemblies, and which has the further advantage that the dollies may be removed and the pipe line used as a manually transportable system.

A further object of the present invention is to provide a dolly for the foregoing purposes, which is made of relatively simple parts which are easily fabricated and assembled, and which is sturdy and of long life.

A further object of the present invention is to provide a dolly for the foregoing purposes which permits of the use of a wheel-mounted pipe line at a relatively low elevation above the ground which is desirable for certain crops, yet which may be moved through fields of standing crops without seriously damaging the plants.

A further object of the present invention is to provide a wheel-mounted pipe line which may be towed by a tractor or other power means through narrow spaces such as gates and lanes without danger that the trailing end of the assembly will strike and destroy gates, fences and the like.

A further object of the present invention is to provide a dolly of the foregoing character which is sturdy yet sufficiently light that it and the section of pipe mounted thereon may be manually moved from place to place by using the attached pipe in the fashion of a draft tongue.

A further object of the present invention is to provide an assembled pipe line and a plurality of dollies supporting the same, sections of which may be manually pushed or pulled laterally with respect to the general longitudinal direction of the pipe line thereby permitting connection of one or either end of the pipe line to a fixed hydrant, pump or other source of water supply.

A further object of the present invention is to provide an assembled pipe line of the foregoing character which will quickly drain itself of contained water when the source of supply is shut off so that movement of the assembly from one place of use to another may be rapidly undertaken, such draining being accomplished by means of automatic drain valves which close when the source of supply is connected thereto and water commences to flow through the irrigating outlets.

A further object of the present invention is to provide an assembly of the character described in which the pipe line is located relatively close to the ground so that the streams of water issuing from the drain valves will not wash holes in the ground and damage young plants.

The foregoing and other objects and advantages of the present invention will be more readily ascertained from inspection of the accompanying drawings taken in connection with the following specification wherein like numerals refer to like parts throughout.

In the drawings,

Fig. 1 is a view in elevation of a section of a rigidly coupled pipe line mounted upon a dolly in accordance with the present invention;

Fig. 2 is a plan view, with parts broken away, of the dolly;

Fig. 3 is a vertical section, on an enlarged scale, taken substantially from the plane of the line 3—3 of Fig. 1;

Fig. 4 is a vertical section taken along line 4—4 of Fig. 3;

Fig. 5 is a vertical section taken substantially along line 5—5 of Fig. 2;

Fig. 6 is a vertical section taken substantially along line 6—6 of Fig. 1;

Fig. 7 is a plan view of a section of a flexibly connected pipe line mounted upon the dolly of the present invention;

Fig. 8 is a vertical section taken substantially along line 8—8 of Fig. 7 and illustrating a modified type of drain valve;

Fig. 9 is a view similar to Fig. 8 illustrating another type of drain valve; and Fig. 10 is a schematic view illustrating one manner of moving a flexibly connected pipe line mounted upon dollies in accordance with the present invention.

In Fig. 1 I have illustrated a pipe line comprising sections 10 of pipe rigidly coupled together by any suitable coupling such as the threaded sleeve coupling 11. Each section of pipe is provided with outlet means such as a spray head 12 mounted on a short riser 13 of relatively small diameter. The riser 13 may be screwed into internally threaded branch outlets 14 of the sleeves 11 as illustrated. Each section of pipe is preferably provided with automatic drain valve means 15 which likewise may be mounted in internally threaded branch outlets integral with the coupling 11.

The dolly of the present invention comprises a substantially rectangular, open frame, the four sides of which comprise angle bars 16 welded together at their ends, each angle bar having one leg uppermost and extending horizontally inward and its other leg outermost and extending vertically downward whereby to present a broad surface which will not cut into standing crops. Preferably the ends of the angle bars are mitered and welded together along their meeting edges to form a planular, rigid construction. Prior to welding the angle bars together the meeting ends of the upper horizontal flanges which provide each of a diagonally opposed pair of corners of the frame are notched to provide the complementary halves of openings in which vertical journals 17 may be received. Each journal preferably comprises a short section of pipe, the upper end of which projects a short distance above the sidebars 16 and the lower end of which projects some distance beneath the same. The vertical legs of the sidebars are welded to the adjacent outer surfaces of the journal 17 whereby to form a rigidly braced corner. Each of the opposite diagonal pair of corners is reinforced by a fillet 18 welded to the horizontal legs of the sidebars in the plane thereof whereby to form a broad surface for supporting a pipe clamp as will appear. A truss bar 19, preferably in the form of a T-bar with the arms of the T uppermost and horizontal, is welded to the meeting ends of the vertical legs of the sidebars at the corners in which the fillets are mounted, and a small reinforcing plate 20 is welded between the end of the truss bar 19 and the fillet 18 to form a rigid, sturdy structure. The truss bar extends along the diagonal of the frame which may be said to define the longitudinal axis of the frame since in use the truss bar underlies the mounted section of pipe 10.

The platforms provided by the meeting upper flanges of the side bars 16 and the fillet 18 each support a pipe clamp preferably comprising a fixed, semicircular, upwardly open clamp member 21 which is centrally welded to the frame and which is provided with a pair of laterally extending, apertured ears 22. A bolt 23 is inserted through the aperture of each of the ears 22, with its stem uppermost and its head 24 beneath the ear 22 and welded thereto. A complementary, downwardly facing, semicircular clamp member 25 is separably retained in position by means of nuts 26 which are threaded onto the upwardly extending ends of the bolts 23 after passing the same through apertures in the laterally extending ears 27 on the strap. The lower clamp member constitutes a saddle for receiving the lower surface of the pipe 10 and the upper clamp member 25 constitutes means to retain the pipe firmly in the saddle. The pair of pipe clamps are coaxially disposed along the diagonal of the frame which constitutes the longitudinal axis thereof. The pipe clamps are sufficiently spaced apart that the pipe section attached thereto as shown in Fig. 10 is rigidly fixed with respect thereto.

Caster wheel means are provided to support the dolly. Each such caster wheel means comprises a vertical stem 30 rotatably received in the journal 17. A collar 31 is welded to an intermediate portion of the stem 30 to provide a thrust bearing support and the stem is retained in position by suitable means such as the cotter pin 32. A portion of the stem projects beneath the collar 31 and provides means to support a caster wheel fork, which comprises a short strap 33 welded to the stem and a pair of arms 34 welded to the ends of the straps and extending diagonally downward in parallel, spaced relation. A wheel 35 is mounted between the arms 34 as by means of an axle 36 passed through aligned apertures in the arms and retained by cotter pins 37. The axle 36 journals the wheel hub 38 which may comprise a short section of pipe. The wheel preferably comprises a relatively broad strap which is rolled and welded together at its ends to form the tread 39, the tread being supported in concentric relation to the hub by a plurality of short straps 40 welded thereto and to the hub, the construction providing a light, sturdy wheel.

It is to be noted that the offset of the axle 36 from a prolongation of the axis of the stem 30 is sufficient to permit free castering action when the frame is pushed or pulled in any direction, but that the axis of the wheel is maintained outwardly from the longitudinal axis of the frame at all times, so that a stable support for the pipe line is presented regardless of the direction in which the dolly is moving.

In Fig. 7 I have illustrated the identical dolly as it is assembled in accordance with my invention in combination with a flexibly coupled pipe line. In the drawing, I have illustrated a pair of sections 41 and 42 of pipe, the section 41 having a quick-acting coupling sleeve 43 connected thereto by means of bolts 44 threaded into internally threaded bosses on the coupling and bearing against the surface of the pipe end which has been thrust into the coupling. The coupling preferably comprises an annular, enlarged portion 45 in which is mounted gasket means (not shown). The coupling constitutes a female member which may have a bell mouth of enlarged diameter and in which suitable gasket means (not shown) may be provided to sealingly engage the inserted end of the pipe section 42. A suitable hook 46 may be mounted on the pipe 42 to engage a suitable catch 47 mounted on the coupling sleeve. A portion of the bell end of the coupling sleeve may be extended to form an apron 48 which acts as a guide to facilitate entry of the pipe and as a support to prevent rolling of the pipe line if it is laid on the ground. A typical coupling of this character is illustrated and described in the patent to Montgomery, No. 2,510,477, granted June 6, 1950, but it is to be appreciated that the present invention may incorporate any suitable coupling. The coupling is preferably provided with an internally threaded outlet connection in which may be mounted a riser pipe of small diameter to support sprinkling means including a hub 49 and one or more lateral arms 50 terminating in jet nozzles 51. In accordance with well-known principles, reaction forces cause the jet nozzles to spin about the axis of the riser, thereby causing long jets of water to be thrown great distances over the surface of a large area. The illustration is schematic and representative of many different types of rotary nozzle devices, forming no part of my present invention.

In accordance with my present invention, the coupling member is supported on the dolly between the two clamps thereof. The clamps comprise wide bands of sufficient length rigidly to retain the opposed pipe sections in axial alignment with each other, thereby eliminating any possibility of angular displacement of the pipe ends with respect to each other as normally permitted by quick-acting, flexible couplers. Therefore, when the pipe line is assembled with a plurality of such dollies, one at each coupling joint, the assembly will be longitudinally rigid except as permitted by the inherent flexibility of the pipe sections. It is well known that even heavy pipe of relatively large diameter will sag between supports and therefore a certain amount of lateral curvature of the assembled pipe line will be permitted. However, stresses will always be present tending to cause the pipe line to assume a straight-line position. These stresses will normally be sufficient to maintain the pipe line in longitudinal alignment during movement so that the entire assembly may be pulled through a narrow gate or alley, without fear of endangering the structure of the assembly or the ground-mounted obstacles. However, removal of both of the upper clamping members will permit placing the entire pipe line upon the ground and its use as a manually-transported system, thus enabling the one set of pipes, couplings and sprinklers to be used in any desired fashion. Similarly, the wheel-mounted assembly may be moved into tight corners by manual labor in relatively simple fashion by removing one of the upper clamping members such as the one which supports the pipe section 42, unlatching and withdrawing the pipe end 42, then using the pipe section 41 as a draft tongue to direct the wheel-supported end into desired position.

In the construction illustrated in Figs. 1 and 6, I have shown an automatic drain valve of conventional type which projects from the surface of the pipe line in a depending fashion, this projecting drain valve being relatively protected in view of the proximity of the coupling to the frame, and, regardless of where placed with respect to the frame, not being seriously in danger since it is contemplated that a rigidly coupled pipe line will always be supported upon the dollies. Such a valve is detailed in Fig. 6 wherein it is seen that the sleeve 11 is provided with an internally threaded outlet projection 55 in which is mounted a valve seat member 56 having an internal flange providing a valve seat 57. The lower end of the member 56 is provided with a coaxial, vertical opening 58 in which is slidably guided a valve stem 59 supporting a valve head 60 which may seat against the valve seat 57 to prevent draining of water from the pipe line. The valve head 60 is normally raised by spring means 61 compressed between the valve head and the lower end of the member 56, the valve stem being limited against upward movement by a crosspin 62. The lower end of the member 56 is provided with a plurality of drain openings 63 which permit rapid escape of the water from the pipe line when the valve head is raised. A wire mesh screen 64 may be soldered in place across the open upper end of the member 56 to prevent leaves and twigs from interfering with the action of the valve. The spring 61 is so proportioned as to force the valve open when the source of water supply is turned off and to permit closing of the valve when pressure is built up in the pipe line so as to limit escape of the water therefrom to the sprinkling heads 12. This type of valve is built in accordance with the principles of the patent to Sherman, No. 1,710,844, issued April 30, 1929.

In Fig. 7, I have illustrated a type of valve which is more suitable for incorporation in an end of the pipe section rather than in the coupling means, and which is more suitable for use in association with quick-acting, flexible couplers since it is contemplated that this system may be dismounted from the dollies and used in direct contact with the ground, the sections being manually transported from position to position. In order that the valve may function, there can be no downwardly projecting valve stem as illustrated in Fig. 6, and in order that the valve apparatus may be protected against damage occasioned by dragging or dropping the pipe on the ground it is preferred that the valve mechanism be contained within the pipe itself. A form of such valve is illustrated in Fig. 7 wherein it is seen that the pipe 42 is provided with an opening in its bottom in which is mounted a grommet 65 providing a drain opening, the inner end of the grommet comprising a flange 66 which constitutes a valve seat. The grommet retains the central body 67 of a resilient member including a pair of upright valve flaps 68, either of which may bend down onto the valve seat 66 to shut off escape of water from the pipe depending upon the direction of flow of water through the pipe. Each flap 68 is provided with a horizontally disposed flexible arm 69 which aids in opening and closing the valve as fully detailed in the patent to Stout et al., No. 2,512,695, issued June 27, 1950.

An alternative form of enclosed automatic drain valve is illustrated in Fig. 8 wherein it is seen that the pipe wall 70 is provided with a drain opening 71 surrounded by a raised bead 72 forming a valve seat. A disc 73 of flexible, rubberous material is adapted to seat upon the valve seat to seal the opening, the disc being supported on a bowed leaf spring 74 by a rivet 75 and retainer disc 76. The ends of the spring 74 are suitably retained in the longitudinal direction of the pipe by means such as rivets 77.

It is to be appreciated that each of the valves herein illustrated comprises automatic drain valve means which will function to seal the drain openings when sufficient pressure exists in the pipe line, and which will so function regardless of the direction of flow of the water whereby the assembled pipe line may be connected to a source of supply at either end. Any suitable other type of valve may be substituted for those herein illustrated, or the valves may be eliminated and the pipe line allowed to drain from either or both ends prior to moving the same. It is, of course, to be appreciated that the pipe line may be moved without bothering to drain the same, especially if there is but a short length and the pipes are of heavy gauge metal. However, the weight of the contained water makes it desirable to provide such automatic drain means at spaced intervals along the pipe line, not only to prevent undue stresses on the pipes themselves, but to lessen the crushing effect of the rolling wheels and to permit movement of the dollies over moist or soft ground. Either end of the assembled pipe line may be connected to a source of water under pressure by any suitable form of connecting means (not shown) as illustrated in the patent to Iverson, No. 1,373,660, issued April 5, 1921.

In Fig. 10 I have illustrated a method of manipulating a pipe line mounted on dollies in accordance with my invention. In this figure, a plurality of pipe sections indicated at 80 are mounted on a plurality of dollies indicated at 81. The pipe line is illustrated in use in attached connection to one of a plurality of outlet means 82 spaced along a permanent ground line 83 which is disposed centrally of the field being irrigated. Thus a pipe line having a length of half the width of the field may be utilized to irrigate the entire field by moving the pipe line from side to side of the central ground line 83, as by means of attaching a tractor 84 to one end thereof and moving the pipe line in a generally longitudinal direction. In so doing, the tractor may traverse the path A indicated by the broken arrows, taking a relatively short path along a reverse curve to bring the pipe line into alignment with the next adjacent outlet means 82. The flexibility of the pipe sections themselves will permit a certain amount of bending of the pipe line to accommodate this movement, however the stresses tending to straighten the pipe line will cause the dolly wheels to set themselves at the proper angular relationship to bring the trailing end of the pipe line over the next outlet connection, as indicated by the solid arrows B. The trailing end of the pipe line may even whip laterally with respect to the ground but the caster wheels will automatically align themselves with the resultant motion so as not to gouge holes in the ground and destroy crops. As indicated by the broken arrow line C, when the pipe line is moved the tractor may follow a very full reverse curve extending beyond the line that the pipe is to assume, thus causing portions of the pipe line to whip around through a shallow reverse curve as indicated by the full arrows D. After a little experience, the tractor driver will know immediately what path to follow in order that a pipe line of a given length will force itself into the position he wishes it to occupy. However, a feature of the present invention is that the caster wheels will permit short sections of the fully assembled pipe line to be pushed or pulled laterally by manual effort so that minor corrections in alignment may be achieved if desired. This is particularly desirable in order that one end or the other may be connected to a suitable source of water.

It is to be appreciated that the dolly comprises a symmetrical, open frame, the sides of which are outwardly broad and inclined to the longitudinal axis of the pipe line, so that standing crops will be pushed aside without being cut or uprooted. Those plants closest to the pipe line may be bent over, but will spring back into the open interior of the frame and may be forced upright again by engagement with the trailing side bar. The caster wheels are illustrated as being proportioned for best results with low crops such as leaf vegetables, small grains and forage crops, but larger wheels may be supplied for use with taller crops such as corn, sorghum and sugar cane if late irrigation is required.

Having illustrated and described a preferred embodi-

I claim:

1. A dolly for supporting a section of field irrigating pipe comprising a symmetrical, centrally open frame, said frame comprising opposed, horizontal, forward side rails diverging rearwardly from one end of the frame to the transverse axis thereof and opposed, horizontal, rearward side rails converging rearwardly from said transverse axis to the opposite end of the frame whereby field plants may be brushed aside when the dolly is moved through a field, each of said side rails consisting of an angle bar having one leg disposed vertically and outermost and its other leg disposed horizontally and uppermost, the adjacent ends of said angle bars being mitered and welded together, pipe clamping means mounted on said frame along the longitudinal axis thereof, said pipe clamping means including upwardly facing saddle means welded substantially tangentially to the upper ends of the horizontally disposed legs of said angle bars and separable complementary means whereby a pipe section may be detachably mounted upon the upper surface of said frame in alignment with and close to the longitudinal axis thereof, a pair of vertical journal means each mounted on said frame along the transverse axis thereof and welded to the ends of the vertical legs of said angle bars, and caster wheel means retained in each of said vertical journal means in depending relation and close to said frame, said caster wheel means being so proportioned with respect to the transverse width of said frame that the axes of the wheels thereof remain outwardly from the longitudinal centerline of the frame in any relative positioning of the wheels.

2. A dolly for supporting a section of field irrigating pipe comprising a symmetrical, quadrilateral, centrally open frame, said frame comprising horizontally disposed angle bars presenting vertical legs outwardly whereby standing crops may be brushed aside without damage when the dolly is moved through a field, the other legs of said angle bars being disposed horizontally inward and uppermost and the adjacent ends of said angle bars being welded together, a pair of pipe clamps each located closely above one of a pair of diagonally opposed corners of said frame, each of said clamps comprising an upwardly facing saddle portion welded to the upper legs of a meeting pair of angle bars and pipe securing means detachably mounted on said saddle portion, said clamps being coaxially aligned whereby to maintain a pipe section in alignment with a diagonal of the frame, a pair of vertical journal means each mounted inside of one of the other diagonally opposed corners of said frame and welded to the vertical legs of a meeting pair of angle bars, caster wheel means retained in each of said vertical journal means closely below said frame, said caster wheel means including wheels whose axes are maintained outwardly from the axes of said clamps at any relative position of said caster wheel means with respect to said frame, and a truss bar welded at its ends to the lower edges of the vertical legs of said angle bars at the corners of said frame to which said saddle portions are welded.

3. A dolly for supporting a section of field irrigation pipe comprising a symmetrical, rigid quadrilateral frame having horizontal portions extending inwardly from the sides of the frame and providing an upper frame surface positionable in parallel relation to the ground, the sides of said frame being formed by a flange extending downwardly from said horizontal portions, said flange being of substantial depth as compared to the thickness of said horizontal portions whereby each side of the frame presents a broad surface to brush standing crops aside without cutting them, said frame also having a rigid reinforcing member extending between side portions of the frame, a pair of pipe clamping means mounted closely above the upper surface of said frame respectively adjacent each of a pair of diagonally disposed corners thereof, each of said pipe clamping means comprising an upwardly open semi-cylindrical saddle member disposed with its axis in alignment with one of the diagonals of said frame, a separable downwardly facing, semi-cylindrical member and means for clamping said members together tightly about a section of pipe disposed therebetween, a pair of vertically disposed journal means mounted on said frame respectively adjacent the other two corners thereof, each journal means being positioned inwardly of the depending flange at the corner to which said journal means is adjacent whereby said journal means does not interfere with the brushing aside of standing crops by said depending flange, and a pair of caster-wheel means journaled respectively in said journal means in depending relation to said frame, said caster-wheel means being so proportioned with respect to the width of said frame that the axes of the wheels thereof remain outwardly from the diagonal along which said pipe clamping means are disposed at any relative positioning of the wheels, and said wheels being of substantially large diameter but closely clearing said frame in any position of said caster-wheel means whereby said dolly may be moved readily in any direction.

References Cited in the file of this patent

UNITED STATES PATENTS

| | | |
|---|---|---|
| 664,240 | Doehring | Dec. 18, 1900 |
| 738,271 | Astle | Sept. 8, 1903 |
| 757,338 | Nolting | Apr. 12, 1922 |
| 1,429,756 | Mitchell | Sept. 19, 1922 |
| 1,601,199 | Clapper | Sept. 28, 1926 |
| 2,604,359 | Zybach | July 22, 1952 |

FOREIGN PATENTS

| | | |
|---|---|---|
| 118,545 | Germany | Mar. 19, 1901 |